US011572731B2

(12) United States Patent
Herman et al.

(10) Patent No.: US 11,572,731 B2
(45) Date of Patent: Feb. 7, 2023

(54) VEHICLE WINDOW CONTROL

(71) Applicant: Ford Global Technologies, LLC, Dearborn, MI (US)

(72) Inventors: David Michael Herman, Oak Park, MI (US); Ashwin Arunmozhi, Canton, MI (US); Michael Robertson, Jr., Garden City, MI (US); Tyler D. Hamilton, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 757 days.

(21) Appl. No.: 16/528,776

(22) Filed: Aug. 1, 2019

(65) Prior Publication Data

US 2021/0032922 A1 Feb. 4, 2021

(51) Int. Cl.

| | |
|---|---|
| ***B60R 22/00*** | (2006.01) |
| ***E05F 15/695*** | (2015.01) |
| ***E05F 15/71*** | (2015.01) |
| ***E05F 15/73*** | (2015.01) |
| ***E05F 15/40*** | (2015.01) |
| ***G08B 13/16*** | (2006.01) |
| ***E05F 15/77*** | (2015.01) |
| ***E06B 7/28*** | (2006.01) |
| ***E05F 15/79*** | (2015.01) |
| *E05F 15/43* | (2015.01) |

(52) U.S. Cl.

CPC ............ *E05F 15/695* (2015.01); *E05F 15/40* (2015.01); *E05F 15/71* (2015.01); *E05F 15/73* (2015.01); *E05F 15/77* (2015.01); *E05F 15/79* (2015.01); *E06B 7/28* (2013.01); *G08B 13/1618* (2013.01); *E05F 2015/432* (2015.01); *E05Y 2400/44* (2013.01); *E05Y 2400/45* (2013.01); *E05Y 2900/542* (2013.01); *E05Y 2900/55* (2013.01)

(58) Field of Classification Search

CPC ......... E05F 15/40; E05F 15/695; E05F 15/71; E05F 15/73; E05F 15/79; E05F 2015/432; E06B 7/28; G08B 13/1618; E05Y 2400/44; E05Y 2400/45; E05Y 2900/542; E05Y 2900/55

USPC ........................................................... 701/49

See application file for complete search history.

(56) References Cited

U.S. PATENT DOCUMENTS 8,412,411 B2 * 4/2013 Burnham ........... G05D 23/1917 701/49
11,222,299 B1 * 1/2022 Baalke ................ G06Q 10/087
(Continued)

FOREIGN PATENT DOCUMENTS

CN 103556901 B 1/2016
JP 2014237929 A 12/2014
(Continued)

*Primary Examiner* — Chi Q Nguyen
(74) *Attorney, Agent, or Firm* — Frank A. MacKenzie; Bejin Bieneman PLC

(57) ABSTRACT

A method includes predicting an environmental condition at a location to which a vehicle is travelling, the environmental condition including at least one of water, dust, and pollution, determining that an object within the vehicle is at a distance greater than a threshold distance from an unobstructed window of the vehicle, and then actuating the unobstructed window to a closed position based on the environmental condition and the object being at the distance from the window greater than the threshold distance.

18 Claims, 2 Drawing Sheets

(56) References Cited

U.S. PATENT DOCUMENTS

| | | | | |
|---|---|---|---|---|
| 2004/0073361 | A1* | 4/2004 | Tzamaloukas | H04L 47/14 701/414 |
| 2007/0152615 | A1* | 7/2007 | Newman | E05F 15/40 318/481 |
| 2010/0174447 | A1* | 7/2010 | Perrin | E05F 15/43 701/29.2 |
| 2016/0109940 | A1* | 4/2016 | Lyren | H04W 4/023 463/2 |
| 2020/0073361 | A1* | 3/2020 | Bapiraju | G01K 7/427 |
| 2020/0207358 | A1* | 7/2020 | Katz | G06F 3/017 |
| 2020/0256112 | A1* | 8/2020 | Williams | E05F 15/71 |
| 2020/0308894 | A1* | 10/2020 | Trask | E05F 15/659 |
| 2021/0031760 | A1* | 2/2021 | Ostafew | B60W 60/0015 |
| 2021/0350634 | A1* | 11/2021 | Major | G06T 19/20 |

FOREIGN PATENT DOCUMENTS

| | | | |
|---|---|---|---|
| KR | 20040056356 | A | 6/2004 |
| KR | 100500821 | B1 | 7/2005 |
| TW | I383898 | B | 2/2013 |

* cited by examiner

VEHICLE WINDOW CONTROL

BACKGROUND

Vehicles, such as passenger cars, typically include sensors to collect data about a surrounding environment. The sensors can be placed on or in various parts of the vehicle, e.g., a vehicle roof, a vehicle hood, a rear vehicle door, etc. A vehicle may include a computer that is programmed to actuate one or more vehicle components, e.g., a window, a climate control system, etc.

DETAILED DESCRIPTION

Figure 1:
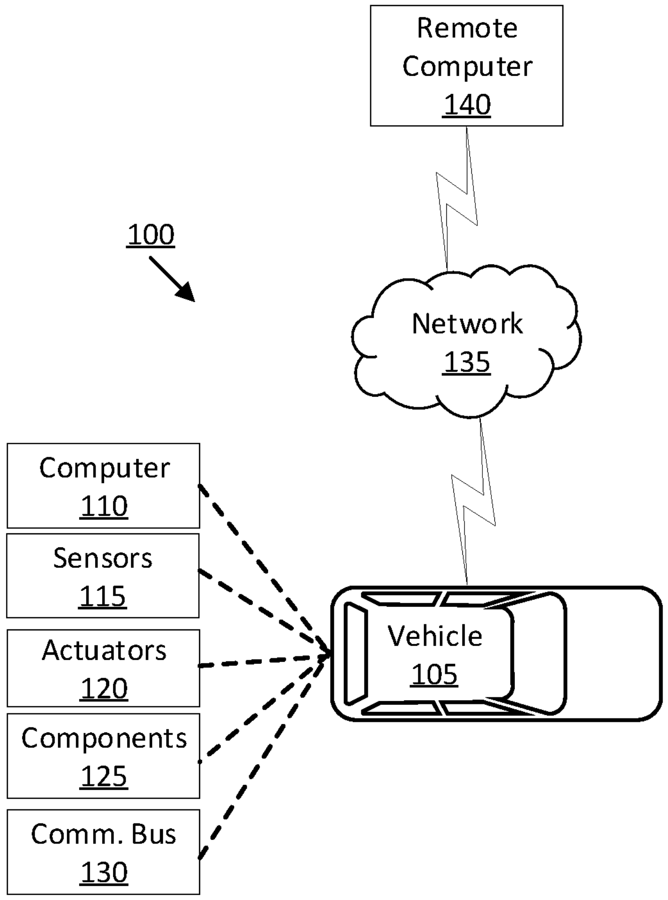
FIG. 1 is a block diagram of an example system for actuating vehicle windows based on a predicted an environmental condition.

A method includes predicting an environmental condition at a location to which a vehicle is travelling, the environmental condition including at least one of water, dust, and pollution. The method further includes determining that an object within the vehicle is at a distance greater than a threshold distance from an unobstructed window of the vehicle, and then actuating the unobstructed window to a closed position based on the environmental condition and the object being at the distance from the window greater than the threshold distance.

The method can include predicting the environmental condition based on sensor data of the vehicle.

The sensor data can include data indicating an occluding material on the sensor. The occluding material can include one of water, dirt, or dust.

The method can include, upon predicting the environmental condition, preventing actuation of the unobstructed window from the closed position to an open position.

The method can include, upon actuating the window, detecting the object within the threshold distance and stopping the actuation of the unobstructed window.

The method can include, upon detecting the object within the threshold distance, preventing actuation of the unobstructed window.

The method can include receiving at least one of high definition (HD) map data and weather data from a remote computer.

The method can include predicting the environmental condition based on at least one of the high definition (HD) map data or the weather data.

The method can include detecting the object based on at least one of sensor data of the vehicle or sensor data of a remote computer.

A system can comprise a compute include a processor and a memory, the memory storing instructions executable by the processor to predict an environmental condition at a location to which a vehicle is travelling, the environmental condition including at least one of water, dust, and pollution. The instructions further include instructions to determine that an object within the vehicle is at a distance greater than a threshold distance from an unobstructed window of the vehicle, and then actuate the unobstructed window to a closed position based on the environmental condition and the object being at the distance from the window greater than the threshold distance.

The instructions can further include instructions to predict the environmental condition based on sensor data of the vehicle.

The sensor data can include data indicating an occluding material on the sensor. The occluding material can include one of water, dirt, or dust.

The instructions can further include instructions to, upon predicting the environmental condition, prevent actuation of the unobstructed window from the closed position to an open position.

The instructions can further include instructions to, upon actuating the unobstructed window, detect the object within the threshold distance and stopping the actuation of the unobstructed window.

The instructions can further include instructions to, upon detecting the object within the threshold distance, prevent actuation of the unobstructed window.

The instructions can further include instructions to download at least one of high definition (HD) map data and weather data from a remote computer.

The instructions can further include instructions to predict the environmental condition based on at least one of the high definition (HD) map data or the weather data.

The instructions can further include instructions to detect the object based on at least one of sensor data of the vehicle or sensor data of a remote computer.

Further disclosed herein is a computing device programmed to execute any of the above method steps. Yet further disclosed herein is a computer program product, including a computer readable medium storing instructions executable by a computer processor, to execute an of the above method steps.

FIG. 1 is a block diagram illustrating an example system 100, including a vehicle computer 110 programmed to predict an environmental condition at a location to which a vehicle 105 is travelling, determine that an object within the vehicle 105 is at a distance greater than a threshold distance from an unobstructed window of the vehicle 105, and then actuate the unobstructed window 125 to a closed position based on the environmental condition and the object being at the distance from the window 125 greater than the threshold distance. The vehicle computer 110 may be programmed to set or maintain a climate inside a cabin of the vehicle 105. As the vehicle 105 is travelling towards the location, the environment at the location may differ from the environment presently around the vehicle 105, which may require the vehicle computer 110 to adjust one or more vehicle components 125, e.g., windows 125, a climate control system, etc., to set or maintain the climate inside the vehicle 105 cabin. Advantageously, the vehicle computer 110 can predict the environmental condition at a location and close one or more windows 125 prior to the vehicle 105 arriving at the location, which can prevent or reduce the environmental condition from entering or affecting the vehicle 105 cabin.

A vehicle 105 includes the vehicle computer 110, sensors 115, actuators 120 to actuate various vehicle components 125, and a vehicle communications bus 130. Via a network 135, the communications bus 130 allows the vehicle computer 110 to communicate with one or more remote computers 140.

The vehicle computer 110 includes a processor and a memory such as are known. The memory includes one or more forms of computer-readable media, and stores instructions executable by the vehicle computer 110 for performing various operations, including as disclosed herein.

The vehicle computer 110 may operate the vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicles 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, etc., as well as to determine whether and when the vehicle computer 110, as opposed to a human operator, is to control such operations. Additionally, the vehicle computer 110 may be programmed to determine whether and when a human operator is to control such operations.

The vehicle computer 110 may include or be communicatively coupled to, e.g., via a vehicle 105 network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, a human machine interface (HMI), etc. Alternatively, or additionally, in cases where the vehicle computer 110 actually comprises a plurality of devices, the vehicle 105 communication network may be used for communications between devices represented as the vehicle computer 110 in this disclosure. Further, as mentioned below, various controllers and/or sensors 115 may provide data to the vehicle computer 110 via the vehicle 105 communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles 105, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item, or specified portion thereof, that can be detected by sensing physical phenomena (e.g., light or other electromagnetic waves, or sound, etc.), e.g., by sensors 115. Thus, vehicles 105, as well as other items including as discussed below, fall within the definition of "object" herein.

As one example, an "object" may include a user, or a portion of a user such as a body part (e.g., a finger, a hand, an arm, a head, etc.), travelling in a vehicle 105. As another example, an "object" may include a package, luggage, or any other object transportable within a vehicle 105.

The vehicle computer 110 is programmed to receive data from one or more sensors 115. For example, data may include a location of the vehicle 105, a location of a target, etc. Location data may be in a known form, e.g., geo-coordinates such as latitude and longitude coordinates obtained via a navigation system, as is known, that uses the Global Positioning System (GPS). Another example of data can include measurements of vehicle 105 systems and components 125, e.g., a vehicle velocity, a vehicle trajectory, etc.

A further example of data can include image data of objects within the vehicle 105 cabin relative to one or more windows 125 and/or window openings. Image data is digital image data, e.g., comprising pixels with intensity and color values, that can be acquired by camera sensors 115. For example, the sensors 115, e.g., a camera, can collect images of objects within the vehicle 105 cabin. The sensors 115 can be mounted to any suitable location of the vehicle 105, e.g., within the vehicle 105 cabin, on a vehicle 105 roof, etc., to collect images of the objects relative to at least one window opening. For example, the sensors 115 can be mounted such that one or more windows openings are disposed within a field of view of the sensors 115. Alternatively, the sensors 115 can be mounted such that the sensors 115 can detect at least one window opening via a reflective surface, e.g., a mirror, a window of a building, etc. The sensors 115 transmit the image data of objects to the vehicle computer 110, e.g., via the vehicle network.

Additionally, or alternatively, the sensors 115 can detect the object is extending through the window opening. For example, the sensors 115 can include one or more transmitters that can transmit a plurality of light arrays to one or more receivers. The light arrays may extend in a common plane across a window opening. That is, the light arrays may be referred to as a "light screen." In this situation, the sensors 115 detect an object is extending through the window opening when one or more light arrays are obstructed by the object, i.e., the light screen is broken. As another example, the sensors 115 may be, e.g., a pressure sensor, a capacitive touch sensor, etc., that can detect the object is contacting the window 125. The sensors 115 can then transmit data indicating an object is extending through a window opening to the vehicle computer 110.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

The vehicle 105 includes a plurality of windows 125. The vehicle computer 110 can actuate one or more of the windows 125 from an open or partially open position to the closed position, e.g., to set or maintain the climate inside the vehicle 105 cabin. For example, the windows 125 in the closed position can prevent or reduce environmental conditions (as defined below), e.g., water, dust, etc., from entering the vehicle 105 cabin via window openings. The windows 125 move across respective window openings when actuated by the vehicle computer 110. In the closed position, the window 125 extends entirely across the respective window opening. In the open position, the window 125 either does not extend across or extends partially across the respective window opening. The vehicle computer 110 can determine the position of the windows 125 based on, e.g., one or more sensors 115, as is known. For example, the vehicle 105 include a reed sensor and a motor that moves one respective window 125 between the open and closed positions. The motor may include one or more magnets that rotate about the motor relative to the reed sensor during movement of the respective window 125. The reed sensor may determine the position of the window 125 based on the number of revolutions of the one or more magnets. That is, the number of revolutions to move the window 125 from the open position to the closed position is known, and may be stored, e.g., in a memory of the vehicle computer 110. The vehicle computer 110 can compare the number of revolutions detected by the reed sensor to the predetermined number of revolutions to determine the position of the window 125.

In addition, the vehicle computer 110 may be configured for communicating via a vehicle-to-vehicle communication bus 130 with devices outside of the vehicle 105, e.g., through a vehicle-to-vehicle (V2V) or vehicle-to-infrastructure (V2X) wireless communications to another vehicle, and/or to a remote computer 140. The communications bus 130 could include one or more mechanisms by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications bus 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 110 may communicate with the remote computer 140. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The remote computer 140 may be a conventional computing device, i.e., including one or more processors and one or more memories, programmed to provide operations such as disclosed herein. For example, the remote computer 140 may be associated with, e.g., a remote vehicle, a remote building, a remote traffic signal, etc., that may be located along the route the vehicle 105 is travelling. In these circumstances, the remote computer 140 is programmed to receive data from one or more remote sensors, e.g., cameras, LIDAR, etc. The remote sensors may, for example, include a field of view that captures the vehicle 105 while the vehicle 105 is travelling. In such an example, the remote sensors, e.g., cameras, may collect image data of objects within the cabin of the vehicle 105 as the vehicle 105 operates within the field of view of the remote sensors. The remote sensors transmit the image data of the objects to the remote computer 140, and the remote computer 140 can then transmit the image data to the vehicle computer 110, e.g., via V2X communications.

The remote computer 140 may be a remote server, e.g., a cloud-based server. The remote computer 140 can receive via a wide area network, e.g., via the Internet, data about a location to which the vehicle 105 is travelling. For example, the remote computer 140 can receive at least one of weather data and high definition (HD) map data of the location. The weather data may be in a known form, e.g., ambient air temperature, ambient humidity, precipitation information, forecasts, wind speed, etc. An HD map, as is known, is a map of a geographic area similar to GOOGLE™ maps. HD maps can differ from maps provided for viewing by human users such as GOOGLE™ maps in that HD maps can include higher resolution, e.g., less than 10 centimeters (cm) in x and y directions. HD maps include road data, e.g., curbs, lane markers, pothole locations, dirt or paved road, etc., and traffic data, e.g., position and speed of vehicles on a road, number of vehicles on a road, etc.

In the present context, an "environmental condition" is a physical phenomenon in an ambient environment, e.g., an air temperature, a wind speed and/or direction, an amount of ambient light, a presence or absence of precipitation, a type of precipitation (e.g., snow, rain, etc.), an amount of precipitation (e.g., a volume or depth of precipitation being received per unit of time, e.g., amount of rain per minute or hour), presence or absence of atmospheric occlusions that can affect visibility, e.g., fog, smoke, dust, smog, a level of visibility (e.g., on a scale of 0 to 1, 0 being no visibility and 1 being unoccluded visibility), presence or absence of atmospheric pollutants that create an odor, etc.

The vehicle computer 110 is programmed to predict the environmental condition of the location. The vehicle computer 110 may be programmed to predict one or more environmental conditions, e.g., separate environmental conditions for each side of the vehicle 105 at the location. The vehicle computer 110 may predict the environmental condition based on at least one of weather data, HD map data, and sensor 115 data. For example, the vehicle computer 110 may determine a condition or characteristic of one or more roads along which the vehicle 105 will travel are, e.g., that a road is unpaved, includes heavy traffic, includes potholes, etc., based on the HD map data. The vehicle computer 110 can then predict an environmental condition, e.g., dust (e.g., from the vehicle 105 operating on an unpaved road), pollution (e.g., exhaust from a plurality of vehicles in a high traffic area), water (e.g., splashed upward from a pothole when impacted by the vehicle 105), etc., may enter the cabin of the vehicle 105 through a window opening while the vehicle 105 is operating at the location. As another example, the vehicle computer 110 can predict precipitation, e.g., rain, sleet, snow, etc., may enter the vehicle 105 cabin while the vehicle 105 is operating at the location based on weather data, e.g., a forecast, of the location. As yet another example, sensor 115 data may identify water and/or dust on one or more remote vehicles, e.g., traveling in an opposite direction as the vehicle 105. In this situation, the vehicle computer 110 can predict an environmental condition is present in front of the vehicle 105, i.e., along the route of the vehicle 105.

Additionally, or alternatively, the sensor 115 data may include data identifying an occluding material on the sensor 115. As used herein, "occluding material" is material that can reduce the data and/or the quality of data collected by the sensors 115 when present on the sensors 115, e.g., dirt, dust, debris, mud, fog, dew, sand, frost, ice, grime, precipitation, moisture, etc. The vehicle computer 110 can determine the type of occluding material using conventional image-recognition techniques, e.g., a machine learning program such as a convolutional neural network programmed to accept images as input and output an identified type of obstruction. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential type of occluding material, and the final output is the type of occluding material with the highest score. The vehicle computer 110 can predict an environmental condition based on the type of occluding material.

The vehicle computer 110 is programmed to determine a distance between an object within the vehicle 105 and at least one window opening. The vehicle computer 110 can determine the distance based on at least one of sensor 115 data from the vehicle 105 or remote sensor data, i.e., image data of the object within the vehicle 105 cabin. The distance is a minimum linear distance from the window opening to the object, e.g., 5 centimeters, 10 centimeters, etc. The vehicle computer 110 compares the distance to a distance threshold. The distance threshold is determined through empirical testing to determine the minimum distance to prevent interference between the object and the window 125 during actuation of the window 125.

Upon detecting the environment condition, the vehicle computer 110 may be programmed to actuate one or more windows 125. In the case that a window 125 is in the closed position, the vehicle computer 110 is programmed to prevent actuation of the window 125 to the open position. In the case that a window 125 is in the open position, the vehicle computer 110 is programmed to actuate the window 125 based on the distance between an object and the respective window 125. For example, in the case that the distance is less than the distance threshold, the vehicle computer 110 can prevent actuation of the window 125. Conversely, in the case that the distance is greater than the distance threshold, the vehicle computer 110 actuates the unobstructed window 125 to the closed position. Additionally, or alternatively, the vehicle computer 110 can actuate a climate control system to a recirculate mode in which the climate control system is substantially closed to the environment, e.g., air is recirculated and remains in the vehicle 105 cabin, when the vehicle computer 110 predicts the environmental condition. After the environmental condition terminates, the vehicle computer 110 can actuate the windows to the open position and/or open the climate control system, e.g., the vents, to the environment.

During actuation of the unobstructed window 125, the vehicle computer 110 compares the distance between an object and the window 125 to the distance threshold. In the case that the distance decreases below the distance threshold while the vehicle computer 110 is actuating the window 125, the vehicle computer 110 stops actuation of the window 125. For example, the sensors 115 may detect the object extending through the window opening, e.g., by breaking the lightscreen, by contacting a sensor 115 on the window 125, etc. In this situation, the sensors 115 transmit data to the vehicle computer 110 indicating the object is extending through the window opening, and the vehicle computer 110 stops actuating the window 125 to the closed position. Conversely, in the case that the distance remains greater than the distance threshold while the vehicle computer 110 is actuating the unobstructed window 125, the vehicle computer 110 continues actuating the unobstructed window 125 to the closed position.

Figure 2:
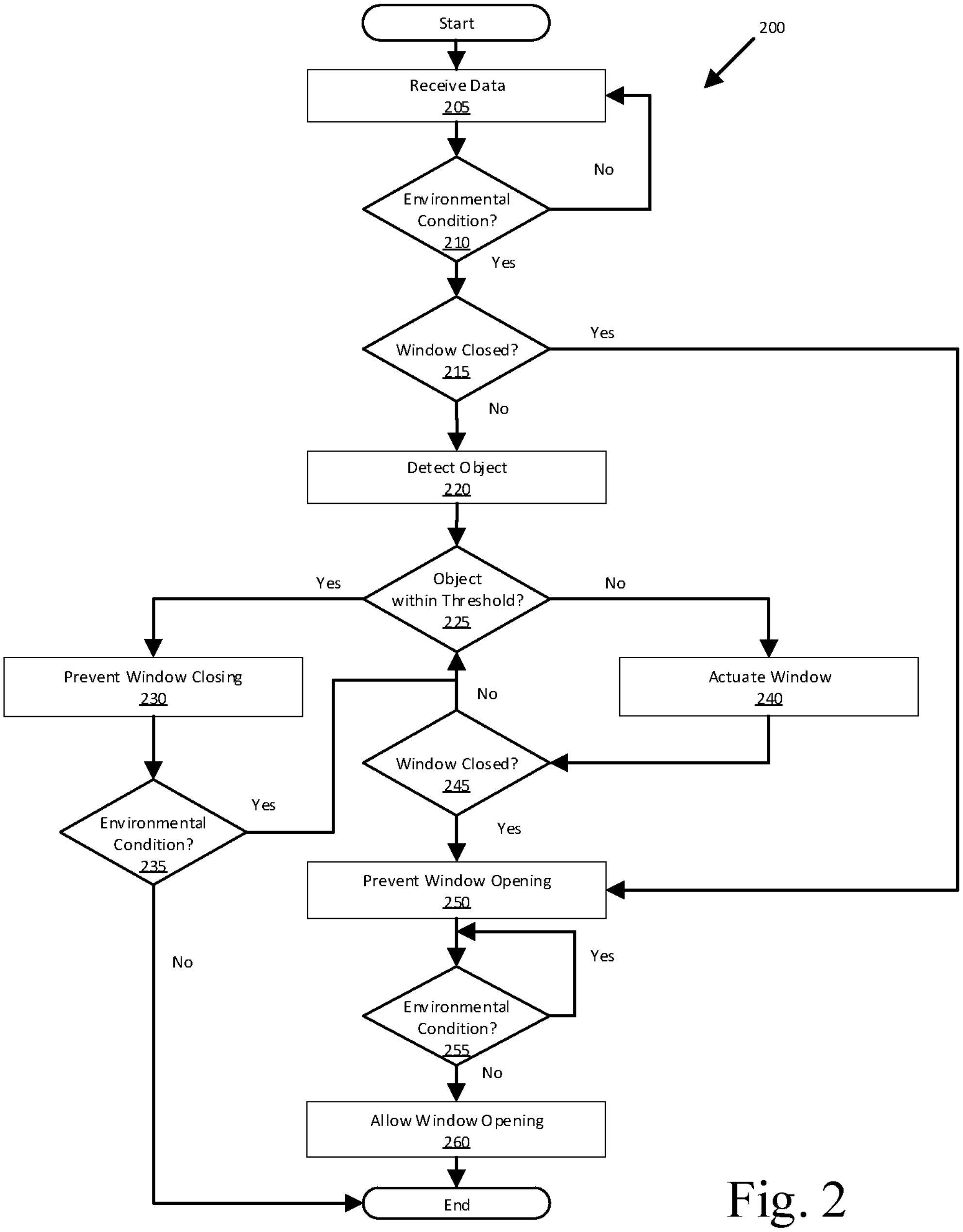
FIG. 2 is a flow chart illustrating an exemplary process to actuate vehicle windows based on the predicted environment condition.

FIG. 2 illustrates a process 200 that can be implemented in the vehicle computer 110 to actuate vehicle windows 125 based on a predicted environmental condition. The process 200 starts in a block 205.

In the block 205, the vehicle computer 110 executes programming to receive at least one of HD map data, weather data, or sensor 115 data of a location to which the vehicle 105 is travelling. The vehicle computer 110 can receive sensor 115 data from one or more sensors 115, e.g., via the vehicle network. The sensor 115 data can indicate an environmental condition, e.g., by detecting material such as water or snow on vehicles travelling from the location towards the vehicle 105, by detecting an occlusion of one or more sensors, by detecting precipitation, or fog, by measuring an ambient temperature, etc. The vehicle computer 110 can receive HD map data and/or weather data from the remote computer 140, e.g., via the network 135. The HD map data can indicate, e.g., road and/or traffic conditions of the location. The weather data can indicate, e.g., a weather forecast of the location. The process 200 continues in a block 210.

In the block 210, the vehicle computer 110 predicts an environmental condition that warrants the window 125 being in the closed position, e.g., to set or maintain the climate inside the cabin of the vehicle 105, at the location. For example, the vehicle computer 110 can analyze the received data, e.g., from the sensors 115 and/or from the remote computer 140, to predict an environmental condition, e.g., precipitation, pollution, dust, etc., that warrants the window 125 being in the closed position at the location. That is, the vehicle computer 110 can predict an environmental condition that warrants the window 125 being in the closed position based on at least one of HD map data, weather data, or sensor 115 data. For example, the vehicle computer 110 can predict precipitation at the location based on weather data, e.g., a forecast, and/or sensor 115 data, as described above. As another example, the vehicle computer 110 can predict dust and/or pollution at the location based on HD map data, as described above. In the case the vehicle computer 110 predicts an environmental condition that warrants the window 125 being in the closed position at the location, the process 200 continues in a block 215. Otherwise, the process 200 returns to the block 205.

In the block 215, the vehicle computer 110 can determine whether the window 125 is in the closed position. The vehicle computer 110 can determine the position of the window 125 based on sensor data 115, as described above. In the case the window 125 is in the closed position, the process 200 continues in a block 250. Otherwise, the process 200 continues in a block 220.

In the block 220, the vehicle computer 110 can detect an object within the cabin of the vehicle 105. The vehicle computer 110 can detect an object based on sensor 115 data and/or remote sensor data. For example, the vehicle 105 can include sensors 115, e.g., cameras, in the cabin of the vehicle 105 that can detect an object. As another example, the vehicle 105 can include sensors 115, e.g., cameras, external to the cabin that can detect an object within the cabin, e.g., via reflective surfaces around the vehicle 105. The sensors 115 can transmit data indicating an object is within the cabin of the vehicle 105 to the vehicle computer 110, e.g., via the vehicle network. Alternatively, the remote computer 140 can be in communication with remote sensors to detect an object within the cabin of the vehicle 105, as described above. In this situation, the remote computer 140 can transmit data indicating an object is within the cabin of the vehicle 105 to the vehicle computer 110. The process 200 continues in a block 225.

In the block 225, the vehicle computer 110 determines whether the object is within a threshold distance from a window 125. The vehicle computer 110 can determine a distance from the window 125 to the object, e.g., based on sensor 115 data and/or remote sensor data. That is, the vehicle computer 110 can analyze the sensor data 115 and/or the remote sensor data to determine a position of the object relative to a window 125. The vehicle computer 110 can then compare the distance to a distance threshold, e.g., stored in a memory of the vehicle computer 110. In the case that the distance is greater than the distance threshold, i.e., the object is not within the threshold distance, the process 200 continues in a block 240. Otherwise the process 200 continues in a block 230.

In the block 230, the vehicle computer 110 prevents the window 125 from closing. That is, the vehicle computer 110 prevents actuation of the window 125 to the closed position. Said differently, the vehicle computer 110 prevents movement of the window 125 across the window opening towards the closed position. The vehicle computer 110 can, e.g., maintain the position of the window 125, or actuate the window 125 to a completely open position. The process 200 continues in the block 235.

In the block 235, the vehicle computer 110 can determine whether the environmental condition that warrants the window 125 being in the closed position is ongoing, i.e., continues to occur at a present time. For example, the vehicle computer 110 can receive sensor 115 data indicating the environment surrounding the vehicle 105, e.g., occlusions on the sensors 115, precipitation and/or dust on the vehicle 105, etc. In the case the environmental condition that warrants the window 125 being in the closed position is ongoing, the process 200 returns to the block 225. Otherwise, the process 200 ends.

In the block 240, the vehicle computer 110 actuates the unobstructed window 125 to close the unobstructed window 125. For example, the vehicle computer 110 may be programmed to actuate the unobstructed window 125 to the closed position. The vehicle computer 110 can actuate unobstructed windows 125 on one or both sides of the vehicle 105. For example, if the vehicle computer 110 predicts an environmental condition that warrants the window 125 being in the closed position on one side of the vehicle 105, then the vehicle computer 110 can close unobstructed windows 125 on the one side of the vehicle 105. Further, the vehicle computer 110 may be programmed to actuate a climate control system in a recirculate mode to set or maintain the climate in the cabin of the vehicle 105, as described above. The process 200 continues in a block 245.

In the block 245, upon actuation of the window 125, the vehicle computer 110 can determine whether the window 125 is in the closed position. The vehicle computer 110 can determine the position of the window 125 based on sensor data 115, as described above. That is, the vehicle computer 110 can determine whether the window 125 is moving from the open position to the closed position or is in the closed position. In the case the window 125 is in the closed position, the process 200 continues in the block 250. Otherwise, the process 200 returns to the block 225.

In the block 250, the vehicle computer 110 prevents closed windows 125 from opening. That is, the vehicle computer 110 prevents actuation of the window 125 from the closed position to the open position. Said differently, the vehicle computer 110 can maintain, i.e., lock, the window 125 in the closed position. The vehicle computer 110 can prevent opening of closed windows 125 on one or both sides of the vehicle 105. For example, if the vehicle computer 110 predicts an environmental condition that warrants the window 125 being in the closed position on one side of the vehicle 105, then the vehicle computer 110 can prevent opening of closed windows 125 on the one side of the vehicle 105. The process 200 continues in the block 255.

In the block 255, the vehicle computer 110 can determine whether the environmental condition that warrants the window 125 being in the closed position is ongoing. For example, the vehicle computer 110 can receive sensor 115 data indicating the environment surrounding the vehicle 105, e.g., occlusions on the sensors 115, precipitation and/or dust on the vehicle 105, etc. In the case the environmental condition that warrants the window 125 being in the closed position is ongoing, the process 200 remains in the block 255. Otherwise, the process 200 continues in the block 260.

In the block 260, the vehicle computer 110 can allow closed windows 125 to open. For example, the vehicle computer 110 may be programmed to actuate the windows 125 from the closed position to the open position. As another example, the vehicle computer 110 may allow, by removing a disablement of a window actuator, the user to select to actuate the windows 125 from the closed position to the open position. The vehicle computer 110 can allow opening of closed windows 125 on one or both sides of the vehicle 105. For example, if the vehicle computer 110 determines the environmental condition that warrants the window 125 being in the closed position is ongoing on one side of the vehicle 105, then the vehicle computer 110 can allow opening of closed windows 125 on the other side of the vehicle 105. Further, the vehicle computer 110 may be programmed to actuate the climate control system to communicate with the environment, e.g., to set or maintain the climate in the cabin of the vehicle 105. The process 200 ends after the block 260.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:

predicting an environmental condition at a location to which a vehicle is travelling, the environmental condition including at least one of water, dust, and pollution;

determining that an object within the vehicle is at a distance greater than a threshold distance from an unobstructed window of the vehicle; and then actuating the unobstructed window to a closed position based on the environmental condition and the object being at the distance from the window greater than the threshold distance.

2. The method of claim 1, further comprising predicting the environmental condition based on sensor data of the vehicle.

3. The method of claim 2, wherein the sensor data includes data indicating an occluding material on the sensor, the occluding material including one of water, dirt, or dust.

4. The method of claim 2, further comprising, upon predicting the environmental condition, preventing actuation of the unobstructed window from the closed position to an open position.

5. The method of claim 1, further comprising, upon actuating the unobstructed window, detecting the object within the threshold distance and stopping the actuation of the unobstructed window.

6. The method of claim 1, further comprising, upon detecting the object within the threshold distance, preventing actuation of the unobstructed window.

7. The method of claim 1, further comprising receiving at least one of high definition (HD) map data and weather data from a remote computer.

8. The method of claim 7, further comprising predicting the environmental condition based on at least one of the high definition (HD) map data or the weather data.

9. The method of claim 1, further comprising detecting the object based on at least one of sensor data of the vehicle or sensor data of a remote computer.

10. A system, comprising a computer including a processor and a memory, the memory storing instructions executable by the processor to:

predict an environmental condition at a location to which a vehicle is travelling, the environmental condition including at least one of water, dust, and pollution;

determine that an object within the vehicle is at a distance greater than a threshold distance from an unobstructed window of the vehicle; and then actuate the unobstructed window to a closed position based on the environmental condition and the object being at the distance from the window greater than the threshold distance.

11. The system of claim 10, wherein the instructions further include instructions to predict the environmental condition based on sensor data of the vehicle.

12. The system of claim 11, wherein the sensor data includes data indicating an occluding material on the sensor, the occluding material including one of water, dirt, or dust.

13. The system of claim 11, wherein the instructions further include instructions to, upon predicting the environmental condition, prevent actuation of the unobstructed window from the closed position to an open position.

14. The system of claim 10, wherein the instructions further include instructions to, upon actuating the unobstructed window, detect the object within the threshold distance and stopping the actuation of the unobstructed window.

15. The system of claim 10, wherein the instructions further include instructions to, upon detecting the object within the threshold distance, prevent actuation of the unobstructed window.

16. The system of claim 10, wherein the instructions further include instructions to download at least one of high definition (HD) map data and weather data from a remote computer.

17. The system of claim 16, wherein the instructions further include instructions to predict the environmental condition based on at least one of the high definition (HD) map data or the weather data.

18. The system of claim 10, wherein the instructions further include instructions to detect the object based on at least one of sensor data of the vehicle or sensor data of a remote computer.

* * * * *